United States Patent
Perras et al.

(10) Patent No.: US 10,313,103 B1
(45) Date of Patent: Jun. 4, 2019

(54) SYSTEMS AND METHODS FOR PRECISE TIME SYNCHRONIZATION WITH OPTICAL MODULES

(71) Applicant: Ciena Corporation, Hanover, MD (US)

(72) Inventors: Daniel Claude Perras, Ottawa (CA); Sebastien Gareau, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/878,703

(22) Filed: Jan. 24, 2018

(51) Int. Cl.
| | |
|---|---|
| *H04B 10/40* | (2013.01) |
| *H04B 10/61* | (2013.01) |
| *H04L 7/00* | (2006.01) |
| *H04J 3/06* | (2006.01) |

(52) U.S. Cl.
CPC .......... *H04L 7/0075* (2013.01); *H04J 3/0638* (2013.01)

(58) Field of Classification Search
CPC .............................. H04B 10/40; H04B 10/616
See application file for complete search history.

(56) References Cited

U.S. PATENT DOCUMENTS

| | | | |
|---|---|---|---|
| 8,718,482 B1 | 5/2014 | Roberts et al. | |
| 9,276,689 B2 | 3/2016 | Geva et al. | |
| 9,432,144 B2 | 8/2016 | Gareau et al. | |
| 2012/0027414 A1* | 2/2012 | Wei ....................... | H04J 3/0655 398/100 |
| 2012/0275501 A1 | 11/2012 | Rotenstein | |
| 2013/0209096 A1* | 8/2013 | Le Pallec .............. | H04J 3/0667 398/35 |
| 2014/0355986 A1 | 12/2014 | Trojer et al. | |
| 2015/0104167 A1* | 4/2015 | Bottari ............... | H04B 10/0775 398/16 |
| 2015/0207714 A1 | 7/2015 | Ruffini et al. | |
| 2016/0380698 A1 | 12/2016 | Elahmadi et al. | |
| 2017/0005949 A1 | 1/2017 | Gareau | |
| 2017/0093757 A1 | 3/2017 | Gareau et al. | |
| 2017/0126589 A1 | 5/2017 | Estabrooks et al. | |
| 2017/0317759 A1* | 11/2017 | Agazzi ................... | H04B 10/40 |
| 2018/0109348 A1* | 4/2018 | Salsi ............... | H04B 10/07955 |

FOREIGN PATENT DOCUMENTS

WO     2017/012486 A1     1/2017

OTHER PUBLICATIONS

Garner, Geoffrey M., IEEE 1588 Version 2, ISPCS, Ann Arbor 08, Sep. 24, 2008, pp. 1-89.
Apr. 5, 2019 International Search Report issued in International Application No. PCT/US2019/014147.

* cited by examiner

*Primary Examiner* — Shi K Li
(74) *Attorney, Agent, or Firm* — Clements Bernard Walker PLLC; Christopher L. Bernard; Lawrence A. Baratta, Jr.

(57) ABSTRACT

An optical module for use in an optical system, the optical module implementing Precision Time Protocol (PTP) clock functionality therein. The optical module includes an electrical interface with the optical system; circuitry connected to the electrical interface and configured to implement a plurality of functions of functionality; an optical interface connected to the circuitry; and timing circuitry connected to the electrical interface and one or more of the plurality of functions, wherein the timing circuitry is configured to implement the PTP clock functionality.

17 Claims, 7 Drawing Sheets

SYSTEMS AND METHODS FOR PRECISE TIME SYNCHRONIZATION WITH OPTICAL MODULES

FIELD OF THE DISCLOSURE

The present disclosure generally relates to optical networking systems and methods. More particularly, the present disclosure relates to systems and methods for precise time synchronization with optical modules.

BACKGROUND OF THE DISCLOSURE

Timing synchronization between nodes in a network is described in various standards such as IEEE 1588-2008 "Standard for a Precision Clock Synchronization Protocol for Networked Measurement and Control Systems," ITU-T G.8265.1/Y.1365.1 "Precision time protocol telecom profile for frequency synchronization," ITU-T G.8275.1/Y1369.1 "Precision time protocol telecom profile for phase/time synchronization with full timing support from the network," the contents of each is incorporated by reference herein. The requisite information for the transfer of precise time is (1) a time reference point, or "significant instant" to which timing information can be related, (2) the timing information itself, and (3) a measure of the delay it takes to transfer the timing information between two nodes. IEEE 1588-2008 is referred to as Precision Time Protocol (PTP) and is used to synchronize clocks throughout the network. IEEE 1588 facilitates time synchronization by transferring time information in packets between network nodes. To synchronize time, a master clock sends time information to a slave clock. In addition, a round trip delay measurement is used to estimate the delay between the master clock and the slave clock. With the time information from the master and an estimate of the packet delay, the slave clock can synchronize its local time to the master clock. Because a round trip delay measurement is used to estimate the one-way delay, the achievable accuracy of time synchronization at the slave clock is dependent upon the forward and reverse path delays being equal. Any difference between the forward and reverse path delays, known as delay asymmetry, will result in a time error if it is not compensated for.

Systems can compensate for delay asymmetry introduced by optical modules if the delay is static. This is typically acceptable for "gray" client optical modules (i.e., QSFP28 LR4) because these modules do not introduce significant amounts of delay. However, some advanced optical modules may introduce dynamic delays. For example, Digital Coherent Optical (DCO) or Coherent Consortium for On-Board Optics (COBO) modules may map the client signal to an asynchronous server layer such as Optical Transport Network (OTN) or in the case of the Optical Internetworking Forum (OIF) ZR, there is an asynchronous remapping of Alignment Markers (AM). The OIF ZR optical modules typically contain complex Physical Medium Attachment (PMA)/Physical Medium Dependent (PMD) functions and are modeled like an Ethernet extension sub-layer. Additionally, coherent optical modules are likely to employ Soft Decision Forward Error Correction (SD-FEC). These processes can introduce delay asymmetry and uncertainty that is dynamic and unpredictable, leading to inaccurate timing.

BRIEF SUMMARY OF THE DISCLOSURE

In an embodiment, an optical module for use in an optical system, wherein the optical module implements Precision Time Protocol (PTP) clock functionality therein, includes an electrical interface with the optical system; circuitry connected to the electrical interface and configured to implement a plurality of functions; an optical interface connected to the circuitry; and timing circuitry connected to the electrical interface and one or more of the plurality of functions, wherein the timing circuitry is configured to implement the PTP clock functionality. The plurality of functions can include management and a datapath and the plurality of functions introduce delay asymmetry in the optical module between a forward direction and a reverse direction in the optical module and the timing circuitry is used to mitigate against delay asymmetry. The plurality of functions can include any of Soft Decision Forward Error Correction, mapping functionality, and coherent modulation.

The PTP clock functionality can include a Transparent Clock. The timing circuitry can determine a timestamp at two point in the plurality of functions and determines a residence time in the optical module. The residence time can be provided to the optical system via one of a field in a PTP message or a follow-up PTP message, each sent over the electrical interface. The PTP clock functionality can also include a timestamping function for use in a Boundary Clock implementation. A signal through the optical module can be compliant to Optical Transport Network (OTN) and the timestamping function can operate based on OTN. The optical module can be compliant to OIF 400ZR, wherein the timing circuitry can utilize reserved bits in Alignment Markers for timestamp references, and wherein PTP messages for the timestamping function are provided over one of an Ethernet data path or the reserved bits. The timing circuitry can obtain an input reference frequency and/or time from the optical system over an existing interface on the electrical interface.

The electrical interface can include one or more pins for a pilot tone to the circuitry in the optical module, and wherein the optical system utilizes the one or more pins for a reference clock input to the optical module. The optical module can be a pluggable optical module compliant to an associated Multi Source Agreement. The optical module can be an on-board optics module.

In another embodiment, an optical module for use in an optical system, wherein the optical module implements Precision Time Protocol (PTP) clock functionality therein, includes an electrical interface with the optical system; Soft Decision Forward Error Correction (SD-FEC) circuitry; mapping and framing circuitry; a coherent modem connected to the SD-FEC circuitry and the mapping and framing circuitry; and timing circuitry connected to the electrical interface, the SD-FEC circuitry, and the mapping and framing circuitry, wherein the timing circuitry is configured to implement the PTP clock functionality.

The PTP clock functionality can include a Transparent Clock. The PTP clock functionality can include a timestamping function for use in a Boundary Clock implementation. The electrical interface can include one or more pins for a pilot tone to the circuitry in the optical module, and wherein the optical system can utilize the one or more pins for a reference clock input to the optical module. The optical module can be a pluggable optical module compliant to an associated Multi Source Agreement. The optical module can be an on-board optics module.

In a further embodiment, a method implemented by an optical module in an optical system includes processing signals in a forward direction from the optical system to a medium; processing signals in a reverse direction from the medium to the optical system; monitoring and determining delay asymmetry between the forward direction and the reverse direction; and performing Precision Time Protocol functionality based on the delay asymmetry.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for precise time synchronization with optical modules. Specifically, the systems and methods include an IEEE-1588 transparent clock and/or timestamping inside a digital coherent optical module (e.g., CFP2-DCO) or onboard optics (e.g., COBO). When including timestamping inside the module, systems housing such modules can implement a transparent clock or boundary clock. The systems and methods can also implement synchronous Ethernet/OTN in the module. The systems and methods make use of the standard defined optical module electrical interface in a novel approach to enable precise timestamping and/or residence time calculation (Management Interface (MI), clock reference input, Inter-Range Instrumentation Group (IRIG)).

Variously, the systems and methods include a Transparent Clock (TC) implemented inside a coherent optical module or on-board optics, a timestamping function implemented inside a coherent optical module or on-board optics, a time base over a clock reference input, a time base over an Ethernet (e.g., Serial Gigabit Media-Independent Interface—SGMII) based MI, a time based over a slow two-wire (e.g., Management Data Input/Output—MDIO) based MI, use of the Optical Internetworking Forum (OIF) 400ZR reserved overhead for a timestamp point of reference, use of a standard MI to communicate PTP timestamps and messages to/from the coherent optical module or on-board optics.

IEEE 1588 is a common way to achieve time synchronization across a network. This protocol facilitates time synchronization by transferring time information in packets between network nodes. To synchronize time, a master clock sends time information to a slave clock. In addition, a round trip delay measurement is used to estimate the delay between the master clock and the slave clock. With the time information from the master and an estimate on the packet delay, the slave clock can synchronize its local time base to the master clock. Because a round trip delay measurement is used to estimate the one-way delay, the achievable accuracy of time synchronization at the slave clock is dependent upon the forward and reverse path delays being equal. Any difference between the forward and reverse path delays, known as delay asymmetry, will result in a time error if it is not compensated for.

Figure 1:
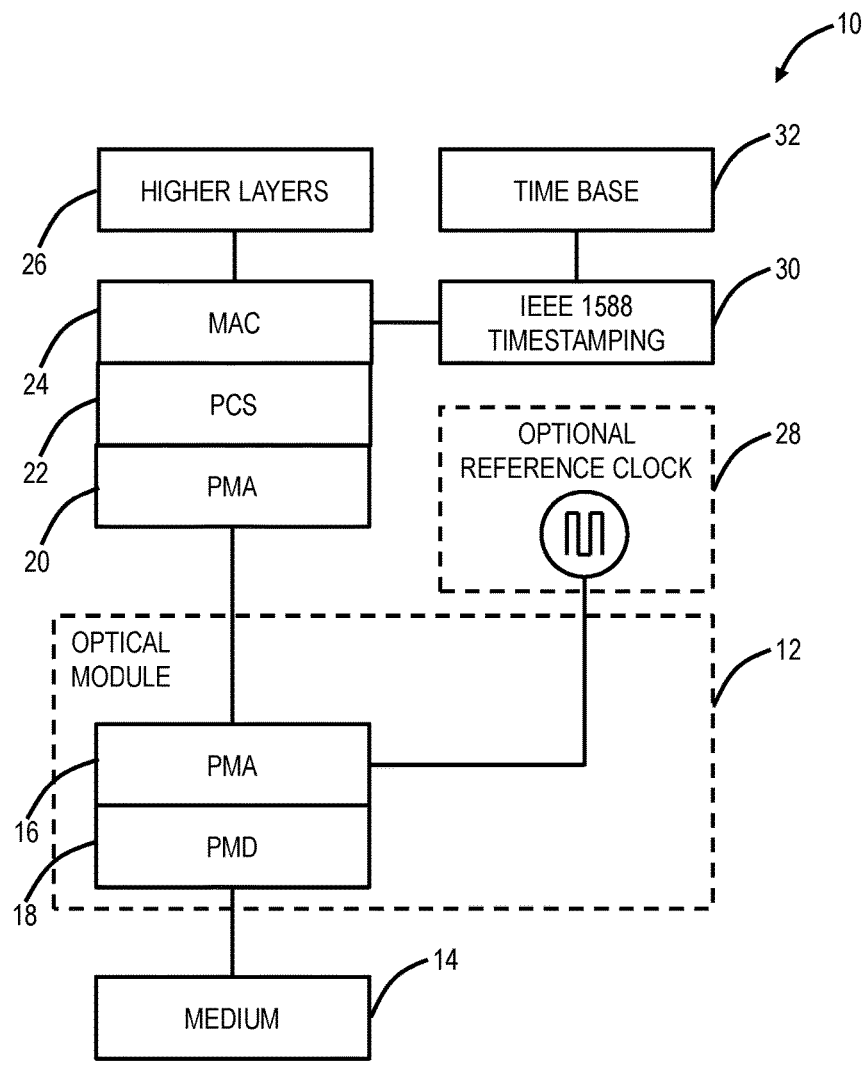
FIG. 1 is a block diagram of a system which supports time or frequency synchronization using IEEE 1588 and which uses an optical module which is IEEE 1588 unaware.

FIG. 1 is a block diagram of a system 10 which supports time or frequency synchronization using IEEE 1588 through a typical optical module 12 which is IEEE 1588 unaware. The optical module 12 can be a pluggable optical module or onboard optics component with a physical interface to a medium 14 (e.g., optical fibers). The optical module 12 includes a Physical Medium Attachment (PMA) layer 16 and a Physical Medium Dependent (PMD) layer 18. The PMA and PMD layers 16, 18 in the optical module 12 may introduce delay asymmetry due to different delays in the forward and reverse directions. However, the delays for such a simple module are known, and the system 10 can compensate for them. This is a common approach to solve this problem.

The system 10 can include a network element, node, etc. housing the optical module 12. The system 10 can also include a PMA layer 20 which connects to the PMA layer 16 in the optical module 12, a PCS layer 22, and a Media Access Control (MAC) layer 24. The MAC layer 24 interacts with higher layers 26 in the system 10. The system 10 includes an IEEE 1588 timestamping module 30 and a time base 32. When the MAC layer 24 timestamps an IEEE 1588 event message with a time from the time base 32 and from the IEEE 1588 timestamping module 30, it can add a fixed offset to compensate for the delay asymmetry that is introduced by the optical module 12. This approach works if the delay introduced by the optical modules 12 is static or constant.

The system 10 can also include an optional reference clock 28 which connects to the PMA layer 16 in the optical module 12. The presence of this reference clock 28 depends on the optical module 12 form factor. For instance, CFP/CFP2/CFP4/CFP8 modules define a reference clock input. On the other hand, QSFP/QSFP-DD and OSFP modules do not define a reference clock input. In the case of CFP/CFP2/CFP4/CFP8, there is no requirement for the phase relationship between the reference clock 28 and the data signals. For COBO modules, there is a clock input reference that is also not required to be phase aligned with the data. COBO also reserves a set of pins for either Ethernet/IP based management or recovered clock output (a choice, not both). The optional reference clock to the module plays no role in PTP for system 10.

Again, the system 10 can compensate for delay asymmetry introduced by the optical module 12 if the delay is static. This is typical acceptable for "gray" client optical modules (i.e., QSFP28 LR4). That is, gray client optical modules do not include advanced functionality such as advanced FEC, coherent modulation, etc. Advanced optical modules may introduce dynamic delays. For example, Digital Coherent Optical (DCO) or Coherent COBO modules may map the client signal to an asynchronous server layer such as OTN or in the case of OIF ZR; there is an asynchronous remapping of Alignment Markers (AM). These optical modules typically contain complex PMA/PMD functions and are modeled like an Ethernet extension sub-layer as in optical modules 12A, 12B in FIGS. 2 and 3.

Figure 2:
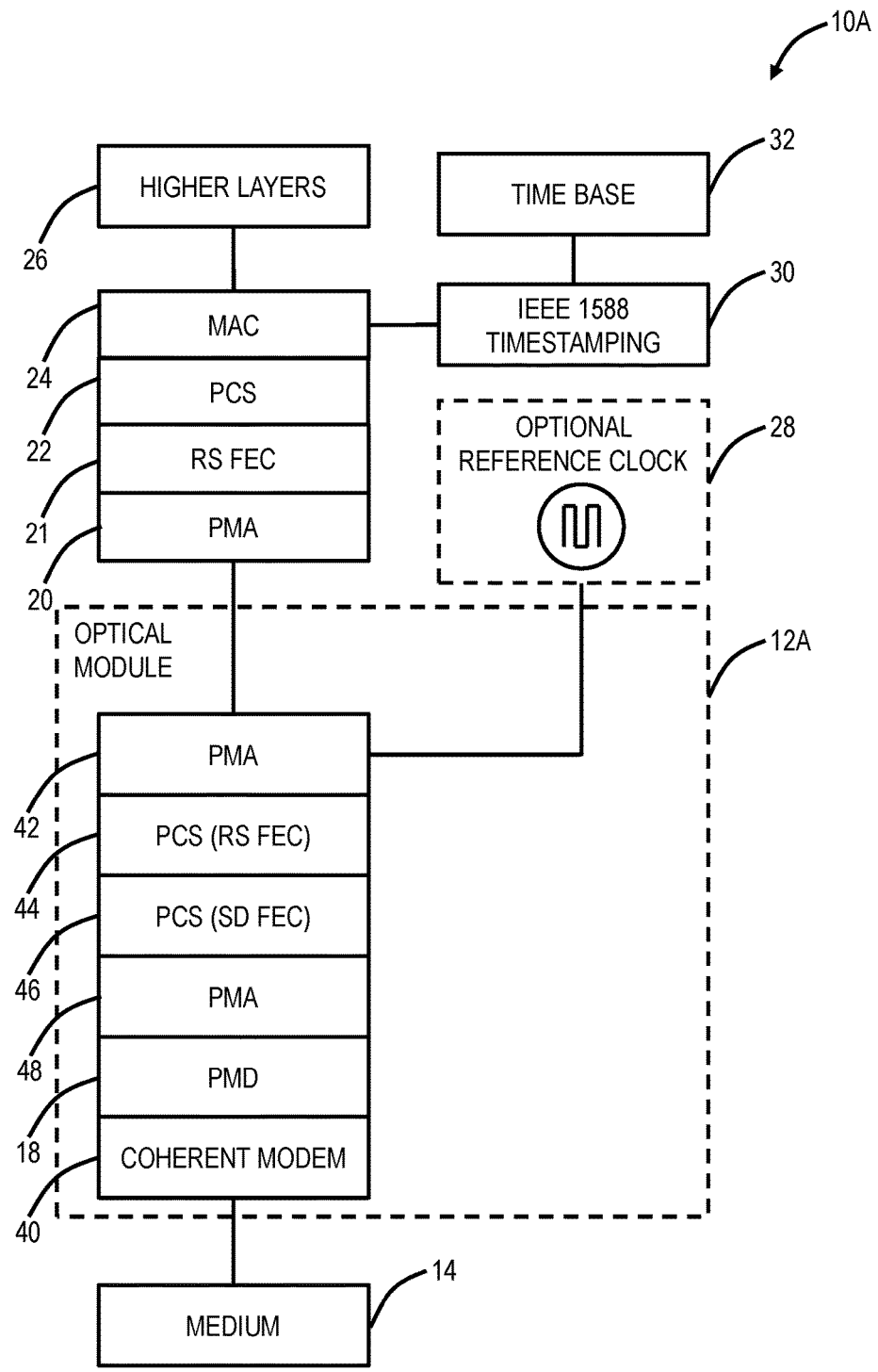
FIG. 2 is a block diagram of a system which supports time or frequency synchronization using IEEE 1588 and which uses a coherent optical module which is IEEE 1588 unaware based on OIF 400ZR (Ethernet Extension)
Figure 3:
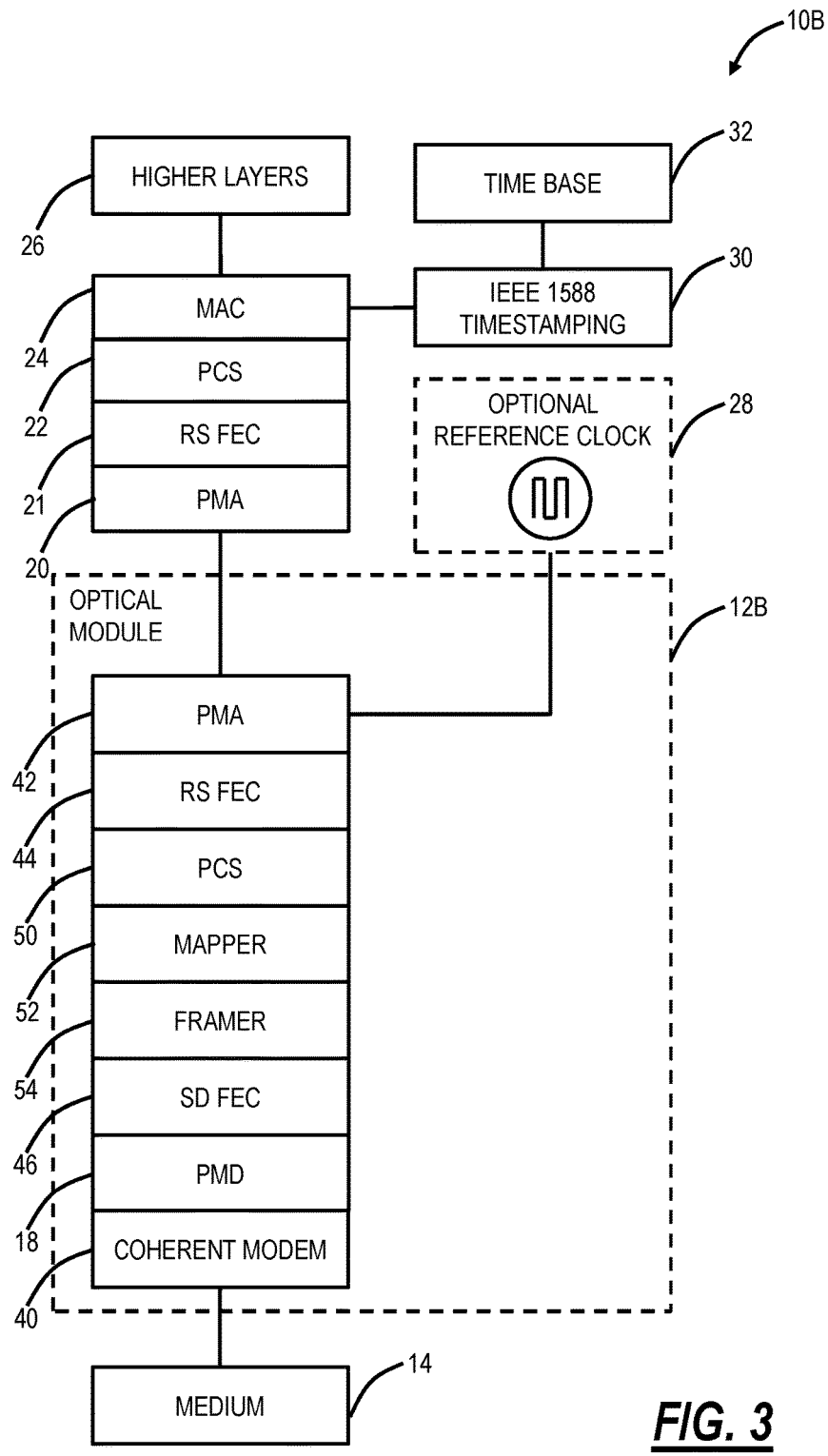
FIG. 3 is a block diagram of a system which supports time or frequency synchronization using IEEE 1588 and which uses a coherent optical module which is IEEE 1588 unaware and with advanced OTN mapping functionality.

FIG. 2 is a block diagram of a system 10A which supports time or frequency synchronization using IEEE 1588 and which uses a coherent optical module 12A which is IEEE 1588 unaware and with advanced functionality. FIG. 3 is a block diagram of a system 10B which supports time or frequency synchronization using IEEE 1588 and which uses a coherent optical module 12B which is IEEE 1588 unaware, includes a coherent modem 40, and with advanced functionality.

The optical module 12A includes a PMA layer 42 connected to the PMA layer 20, an Reed Solomon (RS) FEC layer 44, a Soft Decision FEC (SD FEC) layer 46, another PMA layer 48, and the PMD layer 18. The system 10A in FIG. 2 is similar to the system 10 in FIG. 1 except the optical module 12 has been replaced with one that employs SD-FEC (such as OIF 400ZR for example). The system 10A is typically referred to as an Ethernet extension application.

The coherent optical module 12B includes the PMA layer 42, the RS FEC layer 44, a Physical Coding Sublayer (PCS) layer 50, a mapper 52, a framer 54, the SD FEC layer 46, and the coherent modem 40. The system 10B in FIG. 3 is similar to the system 10 in FIG. 1 except the optical module 12 has been replaced with a DCO module 12B that maps the Ethernet client to a server layer like OTN, via the mapper 52 and the framer 54. In these systems 10A, 10B, the optical modules 12A, 12B may introduce delay asymmetry that is dynamic and unpredictable. Because the delay asymmetry is dynamic, it cannot be compensated for in the timestamp that is inserted by the MAC.

Again, the optical modules 12A, 12B contain complex PMA/PMD functions and are modeled like an Ethernet extension sub-layer. Additionally, the optical modules 12A, 12B may employ the SD FEC. These processes can introduce delay asymmetry and uncertainty that is dynamic and unpredictable.

Again, the present disclosure relates to systems and methods for precise time synchronization with the optical modules 12, 12A, 12B. Specifically, the systems and methods include an IEEE-1588 transparent and/or timestamping function inside a digital coherent optical module (e.g., CFP2-DCO) or onboard optics (e.g., COBO), namely the optical modules 12, 12A, 12B.

Transparent Clock Inside the Optical Module

Figure 4:
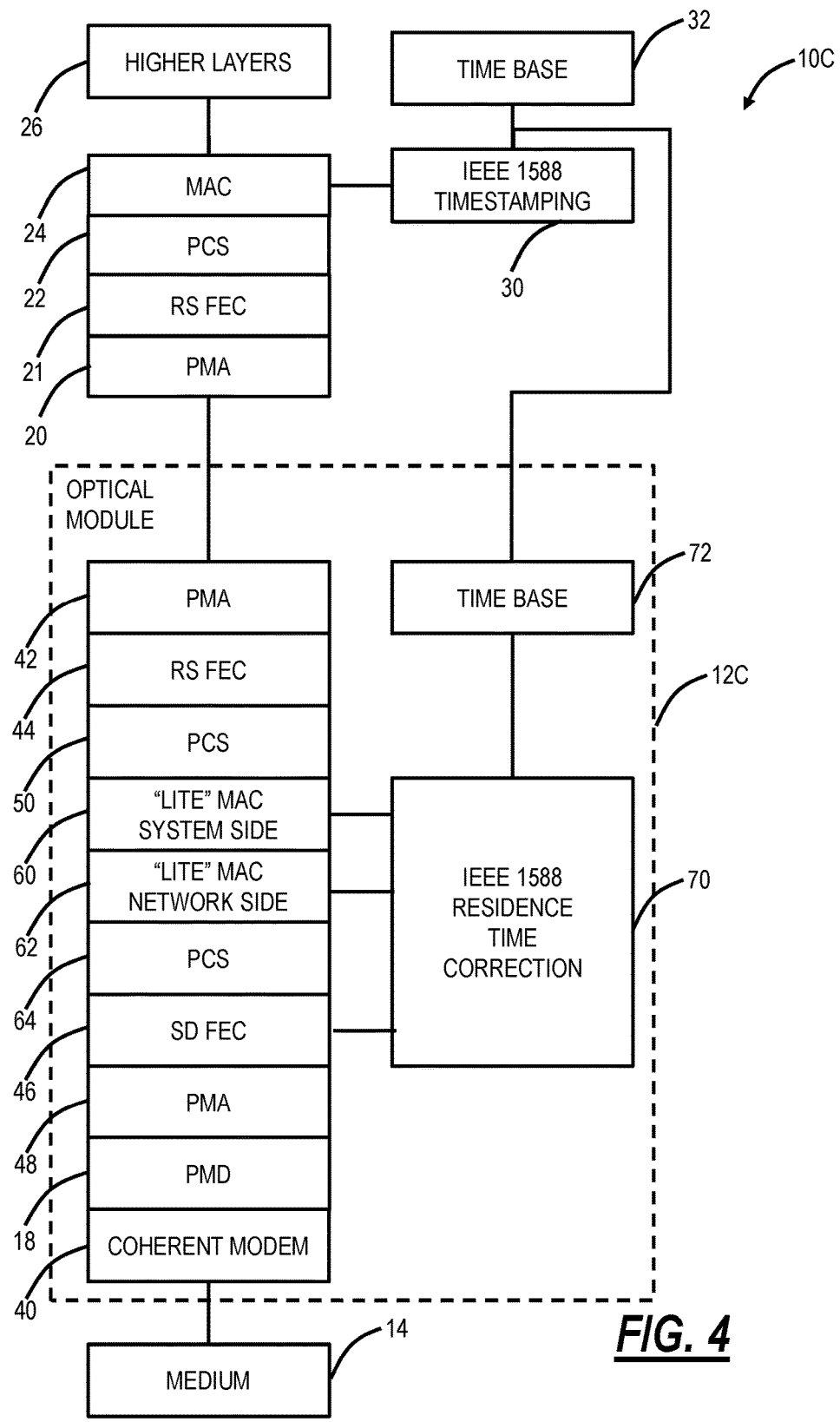
FIG. 4 is a block diagram of a system which supports time or frequency synchronization using IEEE 1588 and which uses a coherent optical module based on OIF 400ZR, which includes a Transparent Clock (TC) inside the optical module.

FIG. 4 is a block diagram of a system 10C which supports time or frequency synchronization using IEEE 1588 and which uses an optical module 12C with advanced functionality such as SD FEC and which includes a Transparent Clock (TC) 70 inside the optical module 12C. The system 10C in FIG. 4 is similar to the system 10A in FIG. 2 with the difference being the TC 70 inside the optical module 12C. The optical module 12C includes the PMA layer 42 connected to the PMA layer 20, the RS FEC layer 44, the PCS layer 50, a "lite" MAC system side layer 60, a "lite" MAC network side layer 62, another PCS layer 64, the SD FEC layer 46, the PMA layer 48, and the PMD layer 18. The optical module 12C can be coherent including the coherent modem 40. Additionally, the optical module 12C includes a TC 70 which is an IEEE 1588 residence time correction module connected to a time base 72 which connects to the timestamping module 30 and the time base 32 in the system 10C. The TC 70 is connected to the layers 46, 60, 62.

Figure 5:
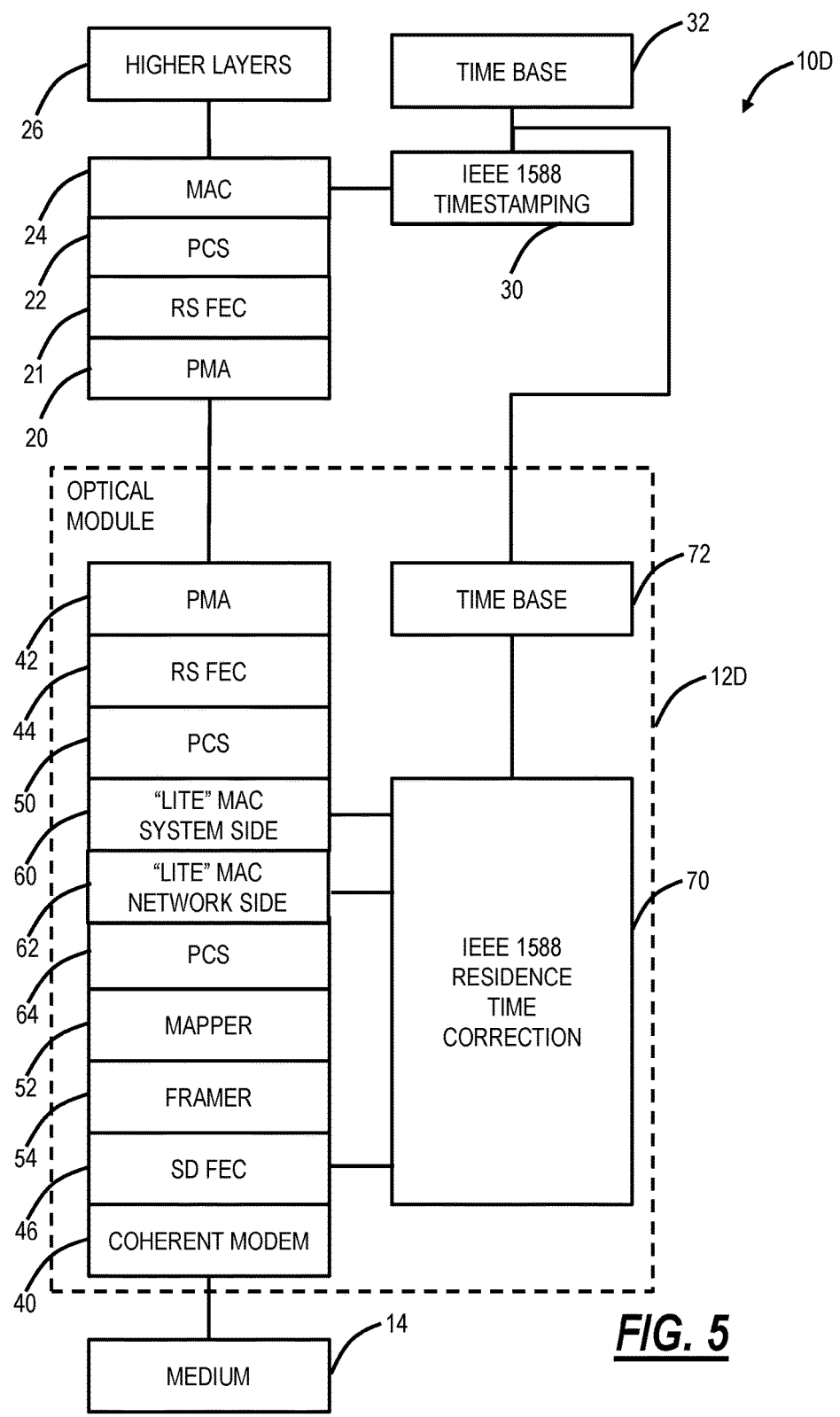
FIG. 5 is a block diagram of a system which supports time or frequency synchronization using IEEE 1588 and which uses a coherent optical module with advanced OTN functionality which includes a Transparent Clock (TC) inside the optical module.

FIG. 5 is a block diagram of a system 10D which supports time or frequency synchronization using IEEE 1588 and which uses an optical module 12D with advanced functionality such as SD FEC and the coherent modem 40, and which includes a Transparent Clock (TC) 70 inside the optical module 12C. The system 10D in FIG. 4 is similar to the system 10B in FIG. 3 with the difference being the TC 70 inside the optical module 12D. The optical module 12D includes the PMA layer 42 connected to the PMA layer 20, the RS FEC layer 44, the PCS layer 50, a "lite" MAC system side layer 60, another PCS layer 64, the mapper 52, the framer 54, the SD FEC layer 46, and the coherent modem 40. The optical module 12D can be coherent including the coherent modem 40. Additionally, the optical module 12D includes a TC 70 which is an IEEE 1588 residence time correction module connected to a time base 72 which connects to the timestamping module 30 and the time base 32 in the system 10C. The TC 70 is connected to the layers 46, 60, 62.

IEEE 1588-2008 introduces a new type of clock called a Transparent Clock (TC). A TC is a multi-port device that forwards PTP messages, measuring the time taken for event messages to pass through the device, and accounts for this so-called residence time by modifying the message, or by sending a separate follow-up message. The other clocks in the system 10C use the delay measured by the TC to compensate for the additional latency introduced between master and slave clocks. In this sense, the TC can be made to "disappear," hence the name "transparent."

The optical module 12C, 12D overcomes the delay asymmetry problems described herein by implementing the TC 70 inside the optical module 12C, 12D. The functionality of the TC 70 operates as described in IEEE 1588-2008. Specifically, a timestamp, T1, is captured at a Start of Frame (SOF) delimiter of an IEEE 1588 event message is detected, such as at one of the layers 46, 60, 62, 64. Another timestamp, T2, is captured at a SOF delimiter of the IEEE 1588 event message is detected at another of the layers 46, 60, 62, 64. A residence time inside the optical module 12C, 12D can be determined as Residence Time (RT)=T2−T1. The residence time can be communicated outside the optical module 12C, 12D to the timestamping module 30 and the time base 32. For example, the residence time can be communicated outside the optical module 12C, 12D through updating a correction field of the IEEE 1588 event message or via a follow-up message according to IEEE 1588. The updating a correction field is performed inside the optical module 12C, 12D, and the follow-up message can be provided inside or outside of the optical module 12C, 12D.

An error in the residence time is introduced if the optical module's 10C, 10D internal time base 72 is not synchronized in frequency to the master clock (i.e., the time base 32). The error is equal to the frequency offset times the latency between the ingress and egress timestamp capture.

In order to synchronize time base 72 in the optical module 12C, 12D to the master clock, a reference clock input can be used. These are typically standard pins on DCO and COBO modules, but they are not meant for this purpose. The reference clock input on typical modules is typically only used to provide a pilot tone to the internal Clock and Data Recovery (CDR) circuits. Also, the optical modules 10C, 10D can insert PTP messages in the line PCS, OTN frame or SD-FEC wrapper (or 400ZR equivalent).

Timestamping Inside the Optical Module for a Boundary Clock Function

Figure 6:
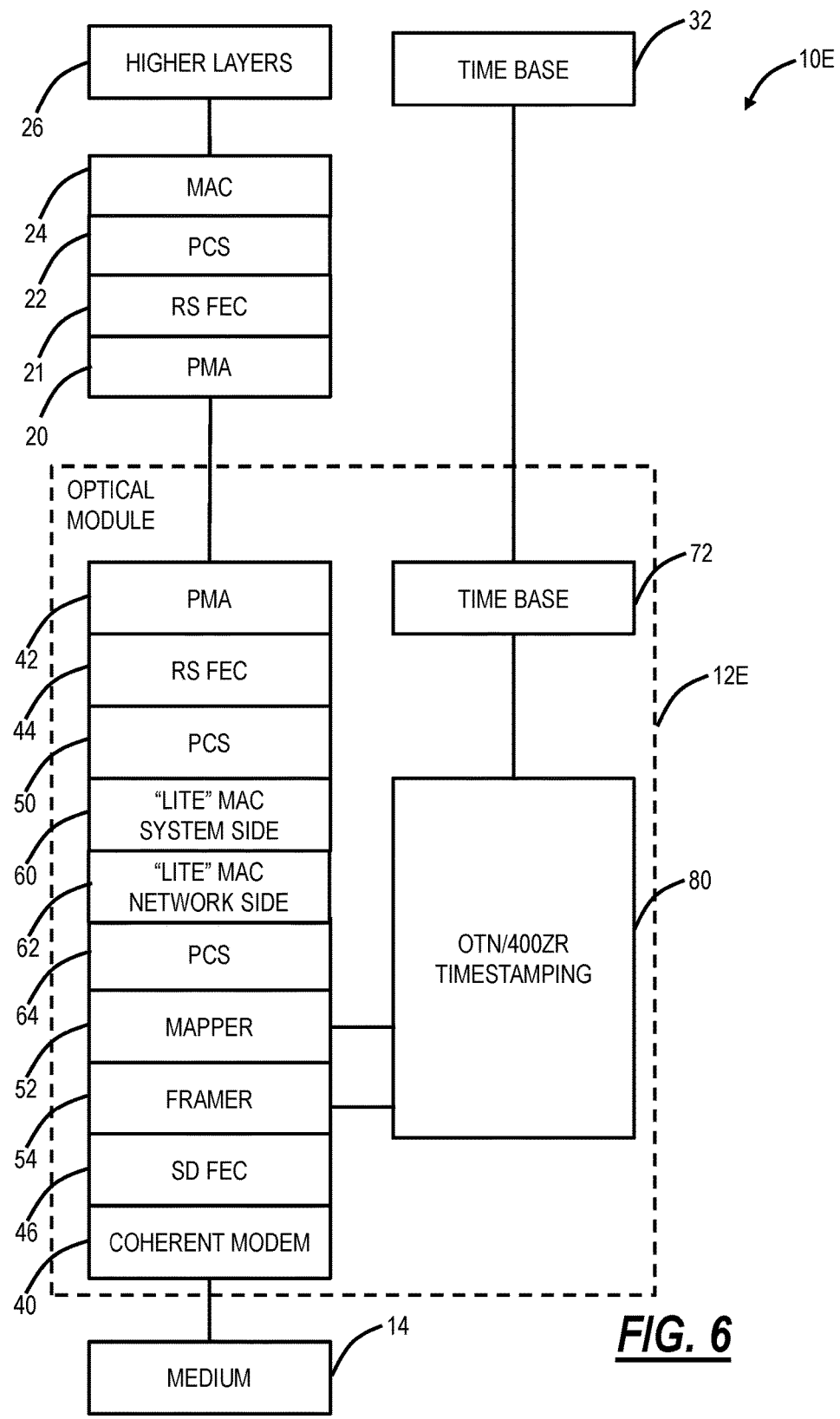
FIG. 6 is a block diagram of a system which supports time or frequency synchronization using IEEE 1588 and which uses an optical module 12E with advanced functionality such as SD FEC and the coherent modem, and which includes timestamping function inside the optical module that allows a system to implement a Boundary Clock (BC)

FIG. 6 is a block diagram of a system 10E which supports time or frequency synchronization using IEEE 1588 by implementing a Boundary Clock (BC) through a timestamping function 80 and which uses a coherent optical module 12E with advanced functionality such as SD FEC and the coherent modem 40, and which includes a timestamping function 80 inside the optical module 12E. The system 10E can overcome the delay asymmetry added by the coherent optical module 12E by implementing the timestamping function 80 inside the optical module 12E instead of using the host MAC device (layer 2), which essentially moves this function closer to the line transmitter/receiver. IEEE 1588-2002 describes Boundary Clocks. A Boundary Clock (BC) is a clock node that has two or more ports. A BC generally has one port in the role of a slave clock and the remaining ports in the role of master clocks. In this case, the BC recovers the time of day within the slave clock function and relays it as a reference to the master clock functions.

The timestamping function 80 can operate as described in G.709 if the server is OTN. If the optical module 12E is based on OIF 400ZR, the timestamping function 80 is new and described in additional detail herein. The timestamping function 80 connects to the framer 54 and the SD FEC layer 56.

Assuming the server is OTN, a timestamp, T1, is captured at a multi-frame boundary detected at the transmitter. If the server layer is OTN in the coherent optical module 12E, then this would be based on OTN Multi-Frame Alignment Signal (MFAS). The host sends a sync message over the MI. The timestamp value is inserted in the sync message that originated from the host. The sync message can be carried in-band in the data plane or out of band using server (i.e., OTN) overhead. The function is similar for the receiver where the timestamp is extracted from the sync message and correlated to the received multi-frame boundary.

This timestamp function 80 requires that its time base 72 be synchronized in frequency, phase, and time to the system time base 32. The next section provides details on how this could be done. Specifically, the systems and methods utilize existing interfaces (e.g., pins defined in MSAs, etc.) to provide the time base 32 to the time base 72 ensuring synchronization between the optical module 12C, 12D, 12E and the system 10C, 10D, 10E.

Time Base Over a Clock Reference Input

The optical modules 12C, 12D, 12E typically only define an input reference clock, which is used as a pilot for CDR circuits. In an embodiment, the systems and methods repurpose the input reference clock pins to provide time and frequency (i.e., the time base 32 to the time base 72) to an optical module 12C, 12D, 12E for 1588/PTP functions inside the optical module 12C, 12D, 12E. A scheme like IRIG can be used to provide this information.

Time Base Over SGMII Based MI:

Some standards (CFP2-DCO and COBO) have reserved a set of pins for the purpose of an Ethernet/SGMII based MI. The interface can be synchronized in frequency to provide the optical module 12C, 12D, 12E a master clock (i.e., the time base 32 to the time base 72). Alternatively, the interface can also be synchronized for Synchronous Ethernet/Optical (SyncE/O) (both transmitted and recovered clock) applications.

Time Base Over MDIO/I2C Based MI

A Management Data Clock (MDC) clock can be used to provide a frequency reference, and the MDIO data can be used to provide phase/time. Also, Inter-Integrated Circuit (I2C) can also be used. For example, time information can be transfer to the modules by writing a register and 1 Hz phase can be provided by using a precisely timed a write sequence to a particular register address.

PTP Message Transfer Over MI

The management interface, being Ethernet-based (e.g., SGMII) or two-wire (MDIO, I2C), could be used for the purpose of communicating IEEE 1588 PTP messages for Transparent Clock and Boundary Clock applications.

PTP on OIF 400ZR Applications

OIF 400ZR is a new scheme that is not based on OTN and does not implement OTN wrapping inside the coherent optical module. OIF 400ZR is a standard for transmitting 400 Gb/s Ethernet over data center interconnection links up to 120 km using Dense Wavelength Division Multiplexing (DWDM) and higher order modulation such as 16 Quadrature Amplitude Modulation (QAM). OIF 400ZR is proposed to be available in small form factor modules such as OSFP or QSFP-DD.

In FIG. 6, assuming the server is OIF 400ZR, the mapper 52 and the framer 54 would be omitted. OTN currently defines schemes to implement PTP. However, OIF 400ZR is not based on OTN and does not implement OTN wrapping inside the coherent optical module. Rather, OIR 400ZR is an Ethernet extension scheme where new AMs (alignment markers) are used on the coherent line, and a new FEC (Concat FEC) is added to the Ethernet structure. In order to implement IEEE 1588, and mitigate against the delay uncertainties added by the OIF 400ZR coherent optical modem, a new timestamp reference has to be defined. For OIF 400ZR, the systems and methods could use reserved bits inside of the OIF 400ZR AMs and create a "multiframe concept" on the order of 200-300 μp for the timestamp point of reference. This is a scheme analogous to what is done for PTP over OTN but uses the structure of OIF 400ZR framing. The PTP message itself can either be injected in the Ethernet data path (Layer 2) or could again use reserved overhead in the OIF 400ZR AMs for its own sync channel (Layer 1).

System and Optical Module

The various systems 10, 10A, 10B, 10C, 10D, 10E can be network elements, nodes, etc. including a switch, a router, a DWDM platform, an OTN switch, a Packet Optical Transport System (POTS), etc. That is the systems 10, 10A, 10B, 10C, 10D, 10E are network elements operating in a network, and the optical modules 12, 12A, 12B, 12C, 12D, 12E are devices incorporated in the network elements for optical connectivity with adjacent network elements. The purpose of IEEE 1588 PTP and the like is to ensure clock synchronization between the network elements. With the systems and methods described herein, delay asymmetry due to the optical modules 12C, 12D, 12E between the network elements is addressed.

Figure 7:
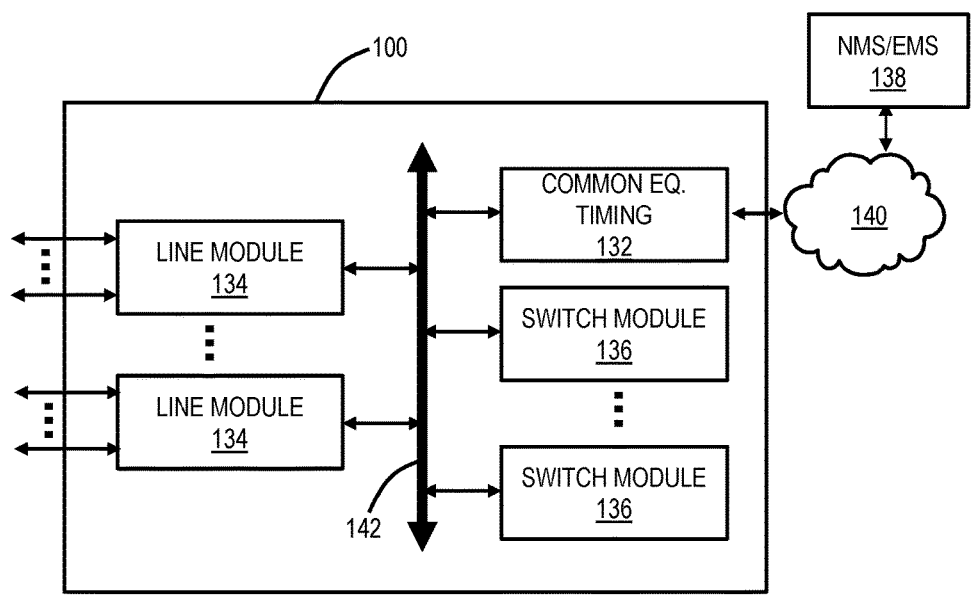
FIG. 7 is a block diagram of an example network element 100 for use with the systems and methods described herein.

FIG. 7 is a block diagram of an example network element 100 for use with the systems and methods described herein. Specifically, the network element 100 can be an implementation of the systems 10, 10A, 10B, 10C, 10D, 10E. For example, the network element 100 may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 100 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 100 can be any digital system and with ingress and egress digital signals and switching of channels, timeslots, tributary units, etc. Also, the network element 100 can be an optical system with ingress and egress of wavelengths and switching of wavelengths. Further, the network element 100 can be a combination of a digital and optical system. While the network element 100 is generally shown as an optical network element, the systems and methods contemplated for use with any system which hosts the optical modules 12C, 12D, 12E and which performs system level timing synchronization.

In an embodiment, the network element 100 includes common equipment 132, one or more line modules 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network (DCN) 140 (as well as a Path Computation Element (PCE), the SDN controller 128, OpenFlow controller, etc.). The management system 138 can include a network management system (NMS), element management system (EMS), or the like. Additionally, the common equipment 132 can include a control plane processor. The network element 100 can include an interface 142 for communicatively coupling the common equipment 132, the line modules 134, and the switch modules 136 to one another. For example, the interface 142 can be a backplane, midplane, a bus, optical or electrical connectors, or the like. The line modules 134 are configured to provide ingress and egress to the switch modules 136 and to external connections on the links to/from the network element 100. In an embodiment, the line modules 134 can form ingress and egress switches with the switch modules 136 as center stage switches for a three-stage switch, e.g., a three-stage Clos switch. Other configurations and/or architectures are also contemplated. The line modules 134 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, OTUCn, OTSiG, Flexible Ethernet (FlexE), Flexible OTN (FlexO), etc.

Further, the line modules 134 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, 100 Gb/s, 400 Gb/s, N×1.25 Gb/s, N×100 Gb/s, and any rate in between as well as future higher rates. The line modules 134 can include wavelength division multiplexing interfaces, short reach interfaces, and the like, and can connect to other line modules 134 on remote network elements, end clients, edge routers, and the like, e.g., forming connections on the links in a network. From a logical perspective, the line modules 134 provide ingress and egress ports to the network element 100, and each line module 134 can include one or more physical ports. The switch modules 136 are configured to switch channels, timeslots, tributary units, packets, etc. between the line modules 134. For example, the switch modules 136 can provide OTN granularity; SONET/SDH granularity; Ethernet granularity; and the like. Specifically, the switch modules 136 can include Time Division Multiplexed (TDM) (i.e., circuit switching) and/or packet switching engines. The switch modules 136 can include redundancy as well, such as 1:1, 1:N, etc.

Those of ordinary skill in the art will recognize the network element 100 can include other components which are omitted for illustration purposes, and that the systems and methods described herein are contemplated for use with a plurality of different network elements with the network element 100 presented as an example type of network element. For example, in another embodiment, the network element 100 may not include the switch modules 136, but rather have the corresponding functionality in the line modules 134 (or some equivalent) in a distributed fashion. For the network element 100, other architectures providing ingress, egress, and switching are also contemplated for the systems and methods described herein. In general, the systems and methods described herein contemplate use with any network element providing switching and/or transport of channels, timeslots, tributary units, wavelengths, etc. and using the control plane.

The network element 100 includes the functions listed in FIGS. 1-6 for the systems 10, 10A, 10B, 10C, 10D, 10E such as the PMA layer 20, the PCS layer 22, the MAC layer 24, the higher layers 26, the reference clock 28, the timestamping module 30, and the time base 32. In operation, two network elements 100 can use a time synchronization protocol such as IEEE 1588 PTP to synchronize their time bases 32 with one another. The systems and methods enable any delay asymmetry due to the optical modules 12, 12A, 12B, 12C, 12D, 12E to be addressed thereby providing a more accurate approach considering the advanced functionality in the optical modules 12, 12A, 12B, 12C, 12D, 12E.

The optical modules 12, 12A, 12B, 12C, 12D, 12E can be either pluggable optical modules such as CFP and variants thereof (e.g., CFP, CFP2, CFP4, CFP8, etc.), QSFP and variants thereof (QSFP, QSFP28, QSFP-DD), OSFP, etc. or optical boards/modules which are incorporated in the line modules 134 such as COBO modules. Of course, the optical modules 12, 12A, 12B, 12C, 12D, 12E could also be proprietary vendor implementations.

In the optical modules 12C, 12D, 12E, the various components are a combination of electrical circuitry and/or optical components. The PMA layer 42 is an electrical interface to the PMA layer 20 in the systems 10C, 10D, 10E. The PMD layer 18 and the coherent modem 40 interface between electrical signals and optical signals and connect to the medium 14 which can be an optical fiber. The various other components in the optical modules 12C, 12D, 12E such as the RS FEC layer 44, the SD FEC layer 46, the PMA layer 48, the PCS layer 50, the mapper 52, the framer 54, the MAC layers 60, 62, the PCS layer 64, etc. are implemented via circuitry to perform various functions as is known in the art.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical module for use in an optical system, wherein the optical module implements Precision Time Protocol (PTP) clock functionality therein, the optical module comprising:
    an electrical interface with the optical system;
    circuitry connected to the electrical interface and configured to implement a plurality of functions;
    an optical interface connected to the circuitry; and
    timing circuitry connected to the electrical interface and the circuitry, wherein the timing circuitry is configured to implement the PTP clock functionality, which is a timestamping function for use in a Boundary Clock implementation,
    wherein the plurality of functions include management and operation of a data path, and the plurality of functions introduce delay asymmetry in the optical module between a forward direction and a reverse direction in the optical module and the timing circuitry is used to mitigate the effect of the delay asymmetry, and
    wherein the optical module utilizes an Ethernet extension scheme where Alignment Markers are used on a coherent line, wherein the timing circuitry utilizes reserved bits in the Alignment Markers for timestamp references, and wherein PTP messages for the timestamping function are provided over one of an Ethernet data path or the reserved bits.

2. The optical module of claim 1, wherein the plurality of functions comprise any of Soft Decision Forward Error Correction, mapping functionality, and coherent modulation.

3. The optical module of claim 1, wherein a signal through the optical module is compliant to Optical Transport Network (OTN) and the timestamping function operates based on OTN.

4. The optical module of claim 1, wherein the timing circuitry obtains an input reference frequency and/or time from the optical system over an existing interface on the electrical interface.

5. The optical module of claim 1, wherein the electrical interface comprises one or more pins for a pilot tone to the circuitry in the optical module, and wherein the optical system utilizes the one or more pins for a reference clock input to the optical module.

6. The optical module of claim 1, wherein the optical module is a pluggable optical module compliant to an associated Multi Source Agreement.

7. The optical module of claim 1, wherein the optical module is an on-board optics module.

8. An optical module for use in an optical system, wherein the optical module implements Precision Time Protocol (PTP) clock functionality therein, the optical module comprising:
    an electrical interface with the optical system;
    Soft Decision Forward Error Correction (SD-FEC) circuitry;
    mapping and framing circuitry;
    a coherent modem connected to the SD-FEC circuitry and the mapping and framing circuitry; and
    timing circuitry connected to the electrical interface, the SD-FEC circuitry, and the mapping and framing circuitry, wherein the timing circuitry is configured to implement the PTP clock functionality, which is a timestamping function for use in a Boundary Clock implementation,
    wherein the plurality of functions include management and operation of a data path, and the plurality of functions introduce delay asymmetry in the optical module between a forward direction and a reverse direction in the optical module and the timing circuitry is used to mitigate the effect of the delay asymmetry, and
    wherein the optical module utilizes an Ethernet extension scheme where Alignment Markers are used on a coherent line, wherein the timing circuitry utilizes reserved bits in the Alignment Markers for timestamp references, and wherein PTP messages for the timestamping function are provided over one of an Ethernet data path or the reserved bits.

9. The optical module of claim 8, wherein the PTP clock functionality comprises a timestamping function for use in a Boundary Clock implementation.

10. The optical module of claim 8, wherein the electrical interface comprises one or more pins for a pilot tone to the circuitry in the optical module, and wherein the optical system utilizes the one or more pins for a reference clock input to the optical module.

11. The optical module of claim 8, wherein the optical module is a pluggable optical module compliant to an associated Multi Source Agreement.

12. The optical module of claim 8, wherein the optical module is an on-board optics module.

13. A method implemented by an optical module in an optical system, the method comprising:
processing signals in a forward direction from the optical system to a medium;
processing signals in a reverse direction from the medium to the optical system, wherein a plurality of functions in the optical module include management and operation of a data path, and the plurality of functions introduce delay asymmetry in the optical module between a forward direction and a reverse direction in the optical module and the timing circuitry is used to mitigate the effect of the delay asymmetry;
monitoring and determining the delay asymmetry between the forward direction and the reverse direction; and
performing Precision Time Protocol (PTP) functionality based on the delay asymmetry, wherein the PTP functionality is a timestamping function for use in a Boundary Clock implementation,
wherein the optical module utilizes an Ethernet extension scheme where Alignment Markers are used on a coherent line, wherein the timestamping function utilizes reserved bits in the Alignment Markers for timestamp references, and wherein PTP messages for the timestamping function are provided over one of an Ethernet data path or the reserved bits.

14. The method of claim 11, wherein the plurality of functions comprise any of Soft Decision Forward Error Correction, mapping functionality, and coherent modulation.

15. The method of claim 11, wherein the optical module is a pluggable optical module compliant to an associated Multi Source Agreement.

16. The method of claim 11, wherein the timestamping function obtains an input reference frequency and/or time from the optical system over an existing interface on an electrical interface.

17. The method of claim 11, wherein the electrical interface comprises one or more pins for a pilot tone to circuitry in the optical module, and wherein the optical system utilizes the one or more pins for a reference clock input to the optical module.

* * * * *